United States Patent [19]

Brownstein

[11] 4,346,011

[45] Aug. 24, 1982

[54] LADEN FLUID CLASSIFYING PROCESS AND APPARATUS

[76] Inventor: Raymond G. Brownstein, P.O. Box 143, Wexford, Pa. 15090

[21] Appl. No.: 184,662

[22] Filed: Sep. 8, 1980

[51] Int. Cl.³ .................... B01D 37/00; B01D 35/20
[52] U.S. Cl. .................................. 210/748; 210/774; 210/785
[58] Field of Search ........... 210/785, 384, 388, 380 R, 210/157, 748, 774

[56] References Cited

U.S. PATENT DOCUMENTS

| | | | |
|---|---|---|---|
| 3,305,481 | 2/1967 | Peterson | 210/785 |
| 3,489,679 | 1/1970 | Davidson et al. | 210/748 |
| 3,788,470 | 1/1974 | Pelmulder et al. | 210/785 |
| 3,933,649 | 1/1976 | Ahlfors | 210/380.1 |
| 3,957,650 | 5/1976 | Petrushkin | 210/380.1 |
| 4,028,232 | 6/1977 | Wallis | 210/785 |
| 4,042,509 | 8/1977 | Bowen | 210/785 |
| 4,158,629 | 6/1979 | Sawyer | 210/785 |
| 4,166,034 | 8/1979 | Bodine | 210/384 |
| 4,169,055 | 9/1979 | Lydford | 210/384 |

Primary Examiner—Robert H. Spitzer
Attorney, Agent, or Firm—Parmelee, Miller, Welsh & Kratz

[57] ABSTRACT

A fluid lading clarifying apparatus and process is provided which utilizes an upright-positioned, fine mesh screen that separates an outer influent fluid lading containing chamber from an inner clarified effluent fluid receiving chamber, and which cooperates with an inside positioned transducer means to induce a continuous particulate removing action on the influent fluid lading and provide a clarified fluid that is continuously moved under capillary action and a slight gradient through the interstices of the screen into the effluent receiving chamber. Ultrasonic energy is used to agglomerate the particulate material, to maintain the screen in a clean condition and its interstices free from flow-blocking air bubbles and thereby assure a continuous flow of influent fluid into the effluent chamber.

6 Claims, 3 Drawing Figures

LADEN FLUID CLASSIFYING PROCESS AND APPARATUS

THE PRIOR ART

There have been many approaches taken in endeavoring to improve the clarification of fluids or liquids by passing laden influent through a screen mesh to provide an effluent from which suspended particles or solids have been removed. This has posed a problem from the standpoint that the screen becomes less efficient as it is used and then tends to substantially fully clog-up. Many approaches have been taken in an attempt to meet this problem and include the use of scrapers, liquid pressure washes, quickly replaceable screens, etc.

One investigator who is interested in removing sludge from sewer water has proposed the use of a continuous belt-like screen which may be advanced on a horizontal plane in an intermittent manner. At an initial position, it defines a substantially horizontally extending clarifying wall portion for separating the sludge from the water. Thereafter, it may be then activated to advance its used portion to a cleaning zone at which built-up solids are to be removed from the screen by ultrasonic vibrations (see Davidson et al. U.S. Pat. No. 3,489,679). The screen is then again actuated to advance its cleaned portion and ultimately return such portion to its original sludge screening position.

All these systems have the common disadvantage that they contemplate permitting the contaminating particles to build up on the wire screen input side from which they are to be then removed to make the screen reusable. This inherently involves a highly inefficient type of operation, in that maximum efficiency is only attained initially when the screen is in its fully clean condition. Flow-through efficiency gradually decreases to practically zero when the interstices or openings in the screen mesh are filled up with particles being removed. Thus, in these systems the materials that are to be eliminated in clarifying the fluid or liquid are permitted to collect and form a closing layer or crust on the input influent side of the screen material from which they have to be thereafter removed in some manner.

THE INVENTION

There has thus been a need for an improved much more efficient type of apparatus and procedure in accordance with which the contaminants or particles will, in effect, be prevented from initially or at any time, collecting or building up on the outer or input surface of the screen material, but will be caused to agglomerate or flocculate and fall to the bottom of the chamber defined by an influent container for subsequent removal. In accordance with the present invention, all the above is accomplished in such a manner that the process may be continued indefinitely without decreasing the efficiency of the clarifying operation, and until a full quantity of contaminated fluid or liquid particulate laden mixture has been clarified.

In finding a solution to the above problem, the applicant made the discovery that it is possible to, in a practical manner, prevent the build-up of particles on the input side of a wire mesh or screen so as to avoid the progressive clogging of its interstices and the need for frequently cleaning and/or replacing the screen material that is being used. It was discovered that a continuous cleaning action could be provided along with a continuous fluid clarifying action, by maintaining both sides of a screen mesh area in a wetted condition, and by applying ultrasonic cavitating energy to the output side of the screen mesh. The application of ultrasonic energy is accomplished in such a manner as to implode air bubbles that would otherwise clog the interstices of the screen mesh, to prevent the formation of a meniscus, to maintain continuity of a clarified fluid flow into an effluent chamber on the output side of the screen, and to separate out, remove and agglomerate particulates in the laden influent fluid adjacent the input side of the screen. An electrically energized transducer is positioned in a cooperating, slightly spaced relation with respect to the output side of an upright positioned screen mesh to apply energy through interstices of the mesh upon contaminating particles in the fluid influent chamber so as to, in effect, move them away from the input side of the screen and into an agglomerating-flocculating relationship in a backwardly spaced relation therefrom. At the same time, such application of energy implodes gas or air bubbles and causes the filtering screen or material to, itself, slightly vibrate and prevent the settling thereon of smaller particles, such as those that are of a size that will permit their passing through the mesh of the screen.

A continuous through movement of the fluid is effected through opposite wetted sides of the screen substantially by capillary action and with a slight gravity gradient being provided. The latter may be accomplished, for example, by maintaining a slightly higher fluid or liquid head between the effluent within the effluent chamber and an outflow storage or reservoir chamber C from which the treated effluent fluid is to be removed (see FIG. 1 of the drawings). In this connection, it has been determined that the level of liquid in the effluent chamber may be the same as that in the influent lading chamber, with a resultant equal heighth of wetting on both sides of the screen, and with the gradient being provided with respect to the maintenance of a lower level of fluid in the storage or reservoir chamber D from which clean effluent is to be removed. This is respresented by the arrow d of FIG 1 of the drawings which, by way of example, may be about a two foot gradient.

In employing a screen of relatively fine mesh of a present optimum of about 5 to 25 microns, it has been determined that air bubbles tend to form and close off its interstices. Also, a capillary flow may be maintained until a meniscus is formed. Either condition will prevent capillary movement through such interstices. Although to a certain extent relative rotation as used in the embodiment of FIG. 1 will have a tendency to break up such bubbles and cause them to rise to the upper surface of the fluid or liquid, of great importance is the fact that the application of ultrasonic energy in the manner herein contemplated positively prevents the forming of a meniscus and implodes any air bubbles that tend to form in interstices of the mesh. Such energy will move through even very small holes to impinge upon the suspended particles in the influent.

Although employing the procedure of this disclosure, a greater portion of the particulate contamination of an influent fluid or liquid is effectively removed by one pass through apparatus of the invention, a multiple step procedure may be employed in which a larger mesh screen is used in first removing larger particles and a smaller mesh screen is used in removing finer minute particles. But, in both instances, particle removal is accomplished by the agglomerating force action of the ultrasonic energy which may be moved in maximum effectiveness through a larger size mesh, such as a 25 micron mesh, to remove larger particles, and which may be moved with lesser energy force through a smaller mesh screen, such as one of about 5 microns in a second stage operation, to remove finer or substantially microscopic particles that may remain after a first stage type of operation.

Using the apparatus of FIG. 1, a continuous first stage flow through of about 30 gallons per minute has been accomplished into an effluent chamber defined by a lower cylindrical screen and an upper cylindrical shell wall, where the screen is rotated at an optimum speed of between about 3 to 30 rpm, is about 25 microns mesh in size, has about a two foot diameter and heighth, with about a two foot gradient, using a particulate laden liquid having desirably, about the viscosity of water (33 Saybolt). By using colored particles as the laden in water it has been determined that the separating-out action is accomplished in the effluent chamber, for the most part, in a slightly spaced but adjacent relation with respect to the input side of the vibrating mesh screen. About a one to one and a half inch spaced relation is provided between transducer units and the inside wall of the wire screen or mesh. This assures an effective and proper application of ultrasonic energy and as well as an inflow clearance for the fluid or liquid passing through the screen into the effluent chamber.

THE INVENTIVE PROCESS

In carrying out the invention two approaches are shown by way of illustration in which at least one and, preferably, two or more transducers are carried in an operative, inwardly spaced relation within a cylindrical frame about which the screen mesh is positioned, and in a substantially equally spaced relation with respect to each other therein. For example, in the embodiment shown in FIG. 1, two transducers are used at a 180° spaced relation with respect to each other. In this type of construction relative movement is provided between the transducers and the cylindrical screen so that the transducers may be effectively used about the full outer circumference of the screen.

Figure 2:
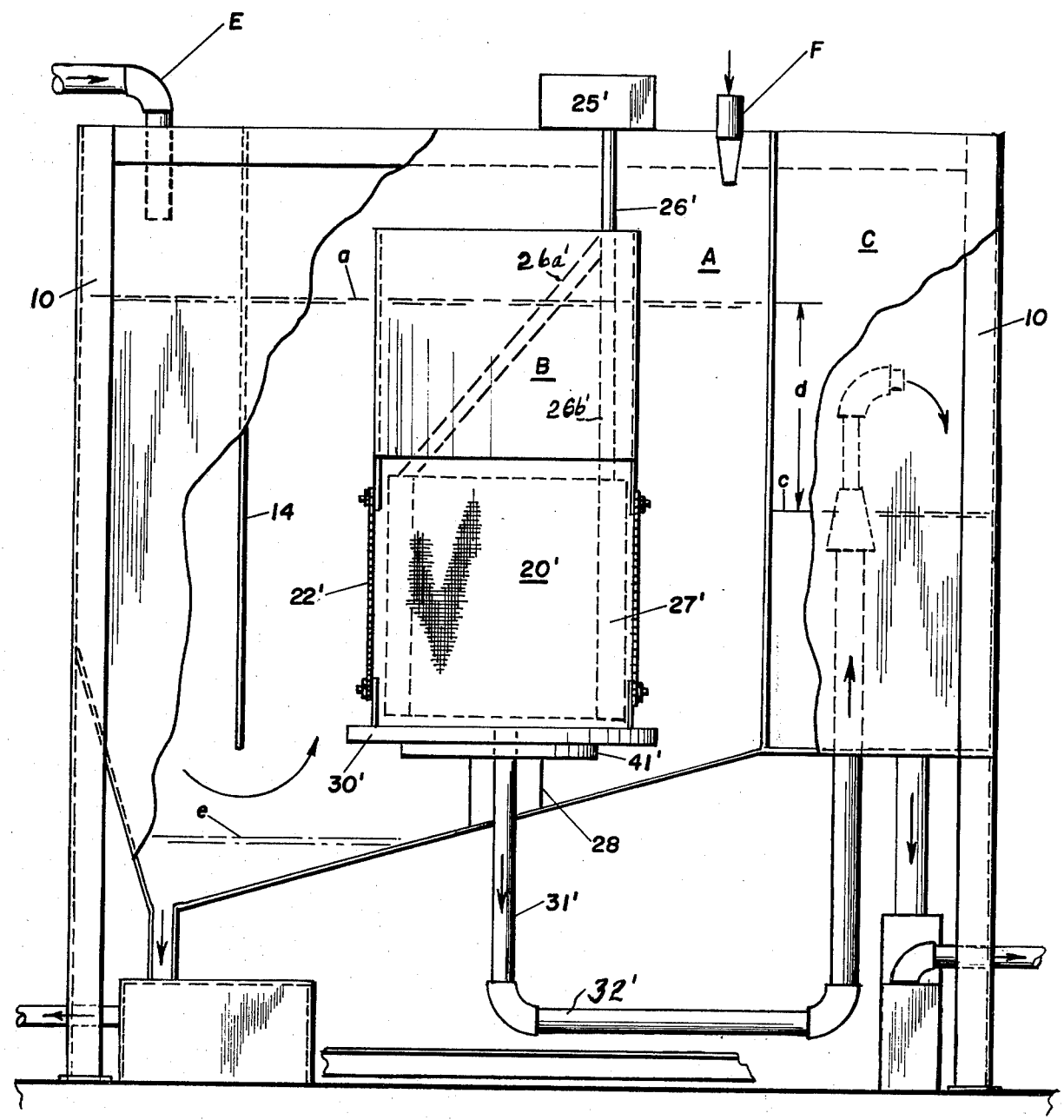
FIG. 2 is a vertical view in elevation and partial section on the scale of FIG. 1 and illustrating a modified construction embodying the invention in which the need for rotation between operating parts is obviated.

A simpler and more efficient arrangement is involved in which the transducer is of continuous cylindrical shape and is positioned in an inwardly spaced relation within the cylindrical screen (see FIG. 2 of the drawings). This eliminates the need for rotative movement between the transducer and the screen which, in the case of the use of one or a pair of spaced-apart transducers may be in the range of about 3 to 30 rpm, with a preferred speed of about 3 to 8 rpm, using a mesh cylinder of about two feet in diameter.

With reference to the transducer, its generator will be positioned outside of the liquid or fluid containers and preferably will be operated at about 25 KHZ rather than 40. Where the nature of the contamination indicates that a better separation can be effected with a higher than ambient temperature, electric immersion heaters may be used. On the other hand, where a colder temperature is indicated, immersion units making use of nitrogen or other suitable fluid may be employed, depending on the temperatures required.

Any suitable commercial ultrasonic equipment may be used. In this connection, a 25 KHZ Branson Cleaning Equipment Company's so-called E-Module generator and immersible transducer with appropriate electrical connections has been successfully used. As to the embodiment of the invention illustrated in FIG. 1 of the drawings, two immersible transducer units may be used, as operated by a single electrical generator. Some adaptation is made, however, to securely mount or hang the transducers in a suspended relation within the effluent chamber in an inwardly spaced relation with respect to the output side of the wire screen cylinder.

Submersible electric heating units for the fluid or liquid solution to be cleaned may be employed independently or provided with transducer units. The heating units may be used to maintain the laden fluid or liquid at a suitable operating temperature, e.g., to provide it with a viscosity that is about the viscosity of water at room temperature.

The transducer equipment employs a generator which converts conventional 50/60 HZ line voltage to high frequency electrical energy that is supplied to transducer means where it is then changed from electrical to mechanical energy. The mechanical energy thus produced is in the nature of ultrasonic longitudinal pressure fluctuations or positive and negative waves that move above and below the pressure of the fluid or liquid into which they are introduced. A momentary reduction in pressure encourages the growth of submicroscopic bubbles, but the immediate reversal and above pressure application discourages such bubble growth and causes collapse of the ones that started to grow. The sudden collapse of the bubbles produces the characteristic effects which are associated with cavitation. When the operation is first initiated, the transducer means initially forces out or causes trapped air bubbles to escape from the fluid or liquid, and then its intensity increases and the full clarifying action of the laden fluid is carried out.

In the embodiment of FIG. 2 where a transducer of continuous circular shape is provided, a special unit may be obtained from one of the manufacturers for this purpose which will provide a substantially uniform output of mechanical energy force about its full circumference within and about the surrounding and spaced-apart cylindrical or circular wire screen part of the apparatus.

DESCRIPTION OF APPARATUS ILLUSTRATED IN THE DRAWINGS

Figure 1:
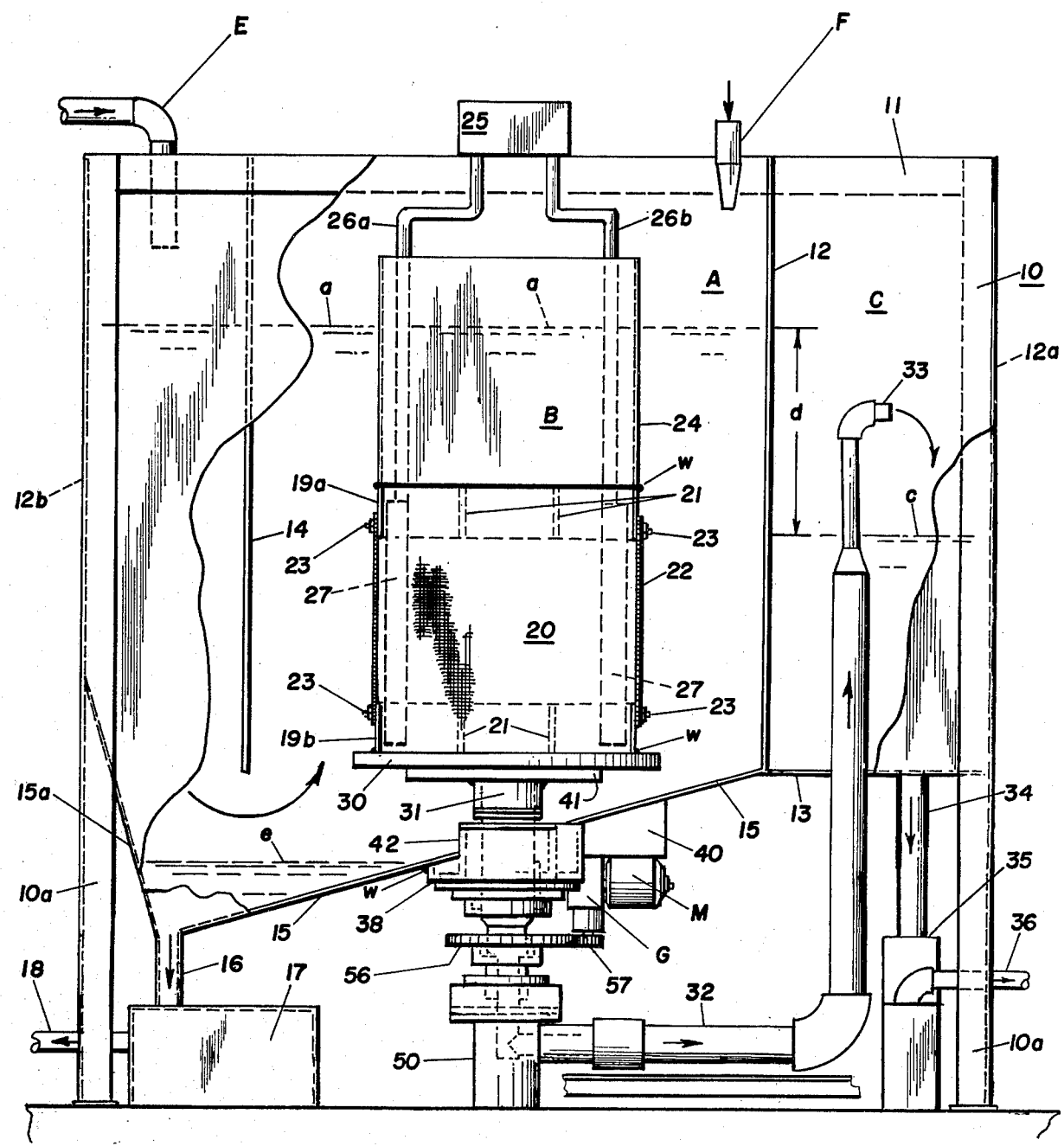
FIG. 1 is a vertical view in elevation and partial section illustrating one apparatus embodiment of the invention.

Referring particularly to FIG. 1 of the drawings, an upright container or tank structure 10 has been provided which is positioned to rest on a shop floor. Spaced-apart upright posts or column members 10a cooperate with plate-like side wall members 12, 12a and 12b and plate-like bottom wall members 13 and 15 and 15a to form the tank 10. The wall members provide a so-called primary or particulate or laden fluid influent receiving chamber A, a clarified effluent fluid receiving chamber B, and a storage or reservoir outflow receiving chamber C for clarified effluent fluid.

Contaminated solution or particle or particulate laden fluid or liquid is introduced through inlet E into the primary chamber A behind a downwardly projecting partition or baffle wall 14 to, as shown by the arrow of FIG. 1, enter the central area of the chamber A within which a centrally-positioned, upright, cylindrical fluid or liquid clarifying operating assembly 20 is positioned. It will be noted that, as shown in FIG. 1, the fluid level represented by a in the chambers A and B is maintained at a higher level than the fluid level c within the storage chamber C to, in effect, provide a flow-inducing gradient represented as d. This aids capillary flow through interstices of an enclosed cylindrical, preferably metal wire, screen mesh member 22. It will be noted in this connection that the fluid level in influent chamber A and in effluent chamber B may be the same. Control over the level of fluid in the chamber A may be automatically maintained by means of a fluid level sensor F, for example, as connected through an automatic valve (not shown) to the inlet pipe E in accordance with conventional practice.

The central operating assembly 20 (see also FIG. 1A) is shown positioned or secured on a circular, rotating bottom closure wall member of table-like configuration 30. Circumferentially spaced-apart frame-like members or pieces 21 are secured to extend downwardly from an upper, open-end, shell or cylindrical wall member 24 and upwardly from the bottom closure wall member 30 to carry upper and lower banding members 19a and 19b to which they may be secured as by weld metal w. The circumferentially extending and vertically spaced-apart metal banding members 19a and 19b, not only serve to mount the cylindrical web-like interstice-defining cylindrical screen 22, but to also carry and support cylindrical, upward, shell or plate-like wall member or part 24 which extends from the upper banding member 19a upwardly beyond the level of liquid a in the chamber B.

It will be noted that the metal banding members 19a and 19b extend across the frame members 21, adjacent the top and bottom portions of the lower half of the assembly 20 and are secured thereto to, in turn, detachably secure the screen web cylinder 22 thereabout, see bolt and nut assemblies 23 of FIG. 1. The upper banding member 19a serves as a mounting bottom support for the cylindrical, plate-like, shell wall member 24 that extends above the water level a and may be secured, as by weld metal w, to the upper banding member 19a. The lower banding member 19b may be secured to the table 30 as by weld metal w.

Figure 1A:
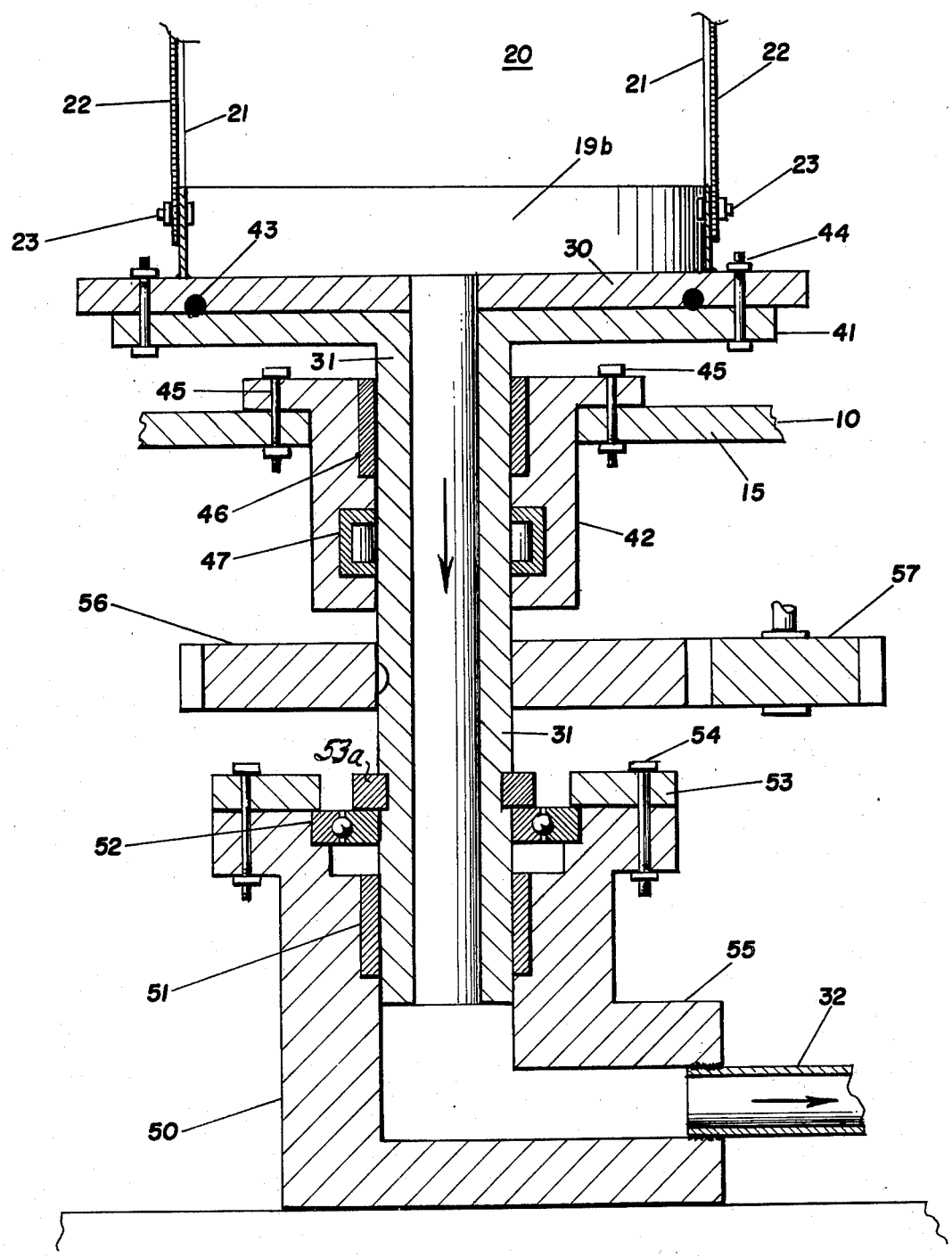
FIG. 1A is a greatly enlarged section of lower operating and supporting structure of the apparatus embodiment illustrated in FIG. 1.

Referring particularly to FIG. 1A, the bottom wall table member 30 is mounted on and secured to a reinforcing t-shaped turntable member 41 as by bolt and nut assemblies 44. As shown, the turntable member 41 carries an O-ring fluid sealing element 43, and has a downwardly extending pipe or tubular fluid outflow member 31. The member 31 acts as a drive shaft. It provides an outflow of clarified effluent fluid or liquid from the chamber B and provides a fluid sealed-off and rotatable support and drive means for the table assembly 30, 41.

The outflow member 31 is first rotatably carried and supported by a sleeve-like gland member 42 that is secured by bolt and nut assemblies 45 to bottom wall member 15 of the chamber A. The lower or open end of the outflow chamber 31 is further rotatably supported by a second sleeve-like gland member 50 which serves as an outflow of L-shape for the clarified fluid to a piping system 32 that may be used to deliver the fluid to a storage or reservoir chamber C through a nozzle 33. The upper gland member 42, as shown particularly in FIG. 1A, has a fluid sealing-off gasket assembly 46 and a bearing assembly 47. In a like manner, the lower gland member 50 has a radial thrust bearing assembly 52 and a fluid sealing-off gasket assembly 51. A cover plate 53 is adapted to be secured by bolts 54 on the gland member 50 to, with locking ring 53a, retain the bearing assembly 52 in position.

Rotative movement of the extending hollow shaft or pipe member 31 is effected through a driving gear assembly 56, 57. The gear 56 is secured or keyed on the pipe member 31 to mesh with a pinion 57 that is mounted on a driven shaft leading from a speed reducing gear unit G (see FIG. 1). An electric motor M is shown connected to drive the unit G. The motor M is mounted on the bottom wall of the container 15 by a bracket 40.

The O-ring 43 seals off the joint between the open central bores through the table members 30 and 41, and the table member 41 carries the tubular drive shaft 31. The gland members 42, 50 provide a rotatable support for the shaft 31, as motor driven. It will be noted that pipe 31 terminates in the gland member 50 which has a side-extending outflow fitting 55 to which outflow pipe system 32 is securely connected. Delivery from this system is effected through the nozzle 33 into the storage or reservoir chamber C. As needed, the effluent may then be removed from the chamber C through an outflow pipe 34, effluent pump 35 and a delivery pipe system 36 (see FIG. 1).

The level of agglomerate particulate which is separated out from the effluent is illustrated by e in FIG. 1. It is accumulated in the left hand bottom portion of the chamber A by reason of the slope of the bottom walls 15 and 15a, and empties from discharge pipe 16 in the bottom of the chamber A. Sludge or agglomerate particulate material may then be removed by a sludge pump 17 through discharge pipe 18.

In the embodiment of FIGS. 1 and 1A, an electric generator unit 25 has two sets of lead wires extending along insulated cables 26a and 26b to energize a pair of transducer (ultrasonic wave producing) units 27 that are positioned in a 180° circumferentially spaced-apart relation with respect to each other, and in a slightly radially inwardly spaced relation with respect to the inside of the screen cylinder member 22.

With reference to the embodiment of FIG. 2, prime suffixes have been applied to reference numerals representing members or parts that are somewhat similar in use to members or parts of the embodiment of FIG. 1. In this connection, the principal change involves the use or provision of a single transducer unit 27' that is of fully circular (cylindrical) extent and waveproducing action, but which like the separate units 27, also is suspended within the inside of a screen 22' in an inwardly spaced relation with respect thereto. Note main supporting cable 26' and relative rigid branch supporting-suspending cables 26a' and 26b'. This construction thus eliminates the need for providing relative rotation between cylindrical or banding transducer unit 27' and the cylindrical screen 22'. The table members 30' and 41' may now carry a securely fixed or non-rotating pipelike outlet member 31' that is directly-secured to and connected by an elbow to the outflow pipe system 32'.

The pair of transducers 27 of FIG. 1 and the single cylindrical transducer 27' of FIG. 2 should be suspended and not connected to the screen material, in order that their distance from the screen surface as well as their alignment may be adjusted with respect thereto. That is, they are desirably hung by any suitable means, such as from relatively rigid cables 26a and 26b or 26', 26a' and 26b' within which the electrical leads are carried. It will be noted that relative rotation as applied to the apparatus of the embodiment of FIGS. 1 and 1A represents a relatively slow movement sufficient for the transducer to cover the screen area at about the rate of fluid or liquid inflow therethrough. In all cases, however, the rotation should never approach a high speed rotation such as would involve centrifugal force action on the fluid being processed. The rotational speed is related to the diameter of the unit 20, the desired effectiveness of the transducers 27, and the number of transducers used. However, the fluid head d of about two feet may be the same throughout.

I claim:

1. An improved method for clarifying a liquid lading effluent by removing contaminating particles therefrom which comprises, continuously introducing liquid effluent into an outer chamber, employing an upstanding screen mesh to provide a central inner influent chamber for receiving clarified liquid therein, maintaining the screen mesh wetted along both sides thereof, maintaining the liquid effluent at about the viscosity of water at room temperature; applying ultrasonic energy within surrounding liquid closely adjacent to and along substantially the full extent of the screen mesh in such a parallel manner as to prevent the forming of a liquid meniscus and the effective forming of air bubbles within the screen mesh, to retain and agglomerate larger contaminant particles within the outer chamber in a spaced relation with respect to the screen mesh, and to continuously prevent clogging of the interstices of the screen mesh by smaller particles; all while moving clarified influent liquid solely under a slight pressure head and capillary action through the screen mesh into the inner chamber; and during the operation, removing agglomerated aggregate from the outer chamber and clarified influent liquid from the inner chamber in such a manner as to maintain the screen in a wetted condition along both sides thereof and to enable a continuous clarification of effluent liquid being introduced into the outer chamber.

2. An improved method as defined in claim 1 wherein the ultrasonic energy is applied within a range of about 25 to 40 KHZ to and along the inside of the screen mesh in an influent liquid encircling spaced relation of about 1 to 1½ inches with respect thereto.

3. An improved method as defined in claim 1 wherein the clarified influent liquid is removed from a bottom portion of the inner chamber in such a manner as to maintain the level of influent liquid within the inner chamber at least equal to the full vertical extent of the screen mesh.

4. An improved method as defined in claim 1 wherein means simultaneously applies the ultrasonic energy in a spaced-apart fully liquid medium interposed encircling relation with respect to and about the screen mesh, a radially spaced relation in the liquid medium of about 1 to 1½ inches with respect to the screen mesh, and without any rotative movement being effected between and of the ultrasonic energy applying means and the screen mesh.

5. An improved method as defined in claim 1 wherein the mesh of the screen is maintained within a range of 5 to 20 microns, and agglomerated aggregate is removed from a bottom portion of the outer chamber and clarified influent liquid is continuously removed from a bottom portion of the inner chamber during the operation.

6. An improved method as defined in claim 5 wherein the viscosity of the liquid effluent is, during the operation, maintained at a viscosity of about 33 Saybolt.

* * * * *

UNITED STATES PATENT AND TRADEMARK OFFICE
CERTIFICATE OF CORRECTION

PATENT NO. : 4,346,011
DATED : August 24, 1982
INVENTOR(S) : Raymond G. Brownstein It is certified that error appears in the above-identified patent and that said Letters Patent is hereby corrected as shown below:

Column 2, line 41, "D" to read -- C --.

Column 8, after line 39, insert

-- 7. An improved method as defined in claim 1 wherein relative rotation is effected between the screen mesh and the application of ultrasonic energy in such a manner as to cover the full extent of the screen mesh with ultrasonic cavitating energy and without inducing centrifugal force action therebetween.

On the title page, "6 Claims" to read -- 7 Claims --.

Signed and Sealed this

Twenty-sixth Day of October 1982

[SEAL]

Attest:

GERALD J. MOSSINGHOFF

*Attesting Officer*     *Commissioner of Patents and Trademarks*